United States Patent [19]
Page

[11] Patent Number: 5,211,521
[45] Date of Patent: May 18, 1993

[54] DEVICE FOR USE IN LOCATING/SECURING REMOVABLE COMPONENTS

[75] Inventor: Robert A. Page, Barton-Le-Cley, United Kingdom

[73] Assignee: Xerox Corporation, Stamford, Conn.

[21] Appl. No.: 942,252

[22] Filed: Sep. 9, 1992

[30] Foreign Application Priority Data

Sep. 11, 1991 [GB] United Kingdom ............... 9119482

[51] Int. Cl.$^5$ .................... F16B 19/00; F16B 37/04
[52] U.S. Cl. ............................ 411/508; 411/182; 411/913
[58] Field of Search ............ 411/112, 174, 175, 182, 411/508–510, 913

[56] References Cited

U.S. PATENT DOCUMENTS

| | | | |
|---|---|---|---|
| 2,400,666 | 5/1946 | Tinnerman | 411/112 |
| 2,571,786 | 10/1951 | Tinnerman | 411/112 |
| 2,767,609 | 10/1956 | Cousino | 85/32 |
| 3,034,616 | 5/1962 | Meyer | 189/88 |
| 4,040,463 | 8/1977 | Petrus | 411/182 |
| 4,286,642 | 9/1981 | Keatley | 411/112 |
| 4,606,688 | 8/1986 | Moran et al. | 411/182 X |
| 4,768,907 | 9/1988 | Gauron | 411/85 |
| 4,828,440 | 5/1989 | Anderson et al. | 411/85 |
| 4,900,209 | 2/1990 | Reynolds | 411/112 X |

*Primary Examiner*—Neill R. Wilson
*Attorney, Agent, or Firm*—Kevin R. Kepner

[57] ABSTRACT

A device is described for use in locating and securing a component, for example a cover panel, in an adjusted position to a main structure. The device is formed from an elongated plate-shaped member which is turned down at each end to form locating legs. The main part of the device sits on the component which is secured to the main structure by a screw which passes through apertures in the device and the component and engages in a threaded aperture in the main structure. When the component has been secured in the desired adjusted position, the legs of the locating device extend into, and grip, the removable component thereby establishing a location in the component for the screw. It is then possible to remove the component from the main structure and replace it in the same position without further adjustment.

11 Claims, 2 Drawing Sheets

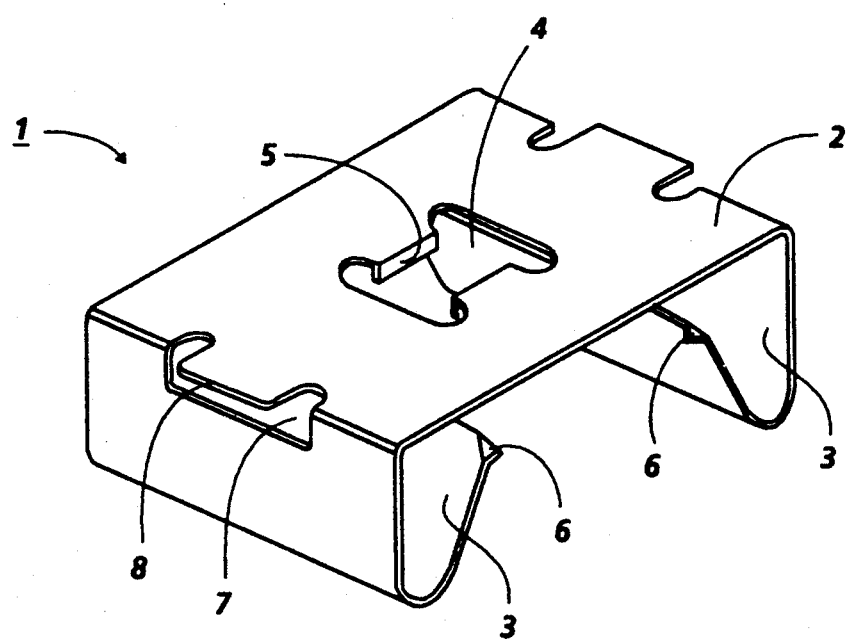
FIG. 1
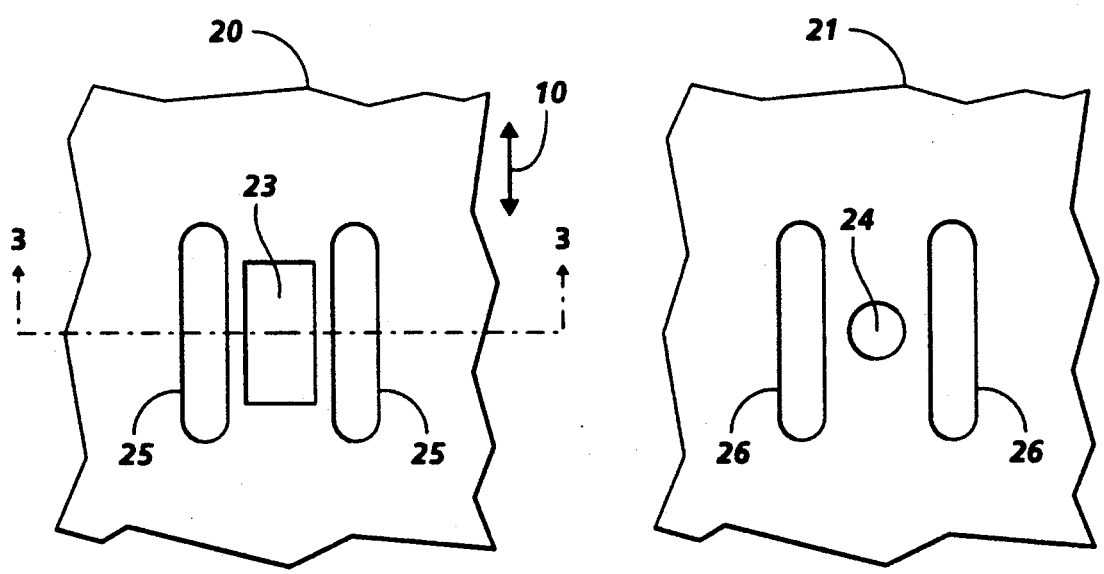
FIG. 2A  FIG. 2B

DEVICE FOR USE IN LOCATING/SECURING REMOVABLE COMPONENTS

The present invention relates generally to a device for use in locating and securing removable components and more particularly concerns attaching cover panels to printing machine frames.

Cover panels on machines are provided for safety and aesthetic reasons and are often removable to facilitate access to the machine when repair or maintenance work is to be carried out. It is clearly desirable, when a cover panel has been removed, that it can be replaced quickly and easily and, moreover, be put back reliably in its original position. However, that is not always easy to achieve, particularly when the design of the cover permits a degree of adjustment in its position on the machine.

The disclosures of U.S. Pat. Nos. 2,767,609; 3,034,616; 4,768,907 and 4,828,440 are of background interest and can be summarized as follows:

U.S. Pat. No. 2,767,609 describes a nut which enables components to be secured to a channel section framework. The nut is held within the channel section by a spring and is positioned by teeth which engage seats on an internal face of the channel section.

U.S. Pat. No. 3,034,616 describes a fastener for retaining a decorative strip over a pinchweld flange. The fastener sits in a cut-out slot in the flange and is held in place by tabs which grip the flange. The decorative strip then clips over the fastener.

U.S. Pat. No. 4,768,907 describes a nut insert for location in an opening in a channel section. The insert has end walls in the form of spring legs which allow the insert to be pushed into the channel but which then move apart to retain the insert within the channel. The insert is capable of a limited amount of movement within the channel.

U.S. Pat. No. 4,828,440 also describes a nut insert for location in a channel section. The insert has spring arms which flex to permit the insert to be located within the channel but which then return to their original position to prevent the insert from leaving the channel. The insert is not completely fixed within the channel but is free to float to a limited extent.

In accordance with one aspect of the present invention, there is provided a mounting assembly comprising a first member defining an aperture and a second member. Means for adjustably locating and securing the first member to the second member in an adjusted position, the locating and securing means extending into the aperture of the first member and gripping the first member so as to enable the first member to be removed from the second member and subsequently re-secured thereto in substantially the adjusted position without additional adjustment is also provided.

By way of example, an embodiment of the invention will be described with reference to the accompanying drawings, in which:

FIG. 1 is a perspective view of a location clip;

FIGS. 2A and 2B are plan views showing portions of the brackets with which the clip of FIG. 1 is used;

Figure 3:
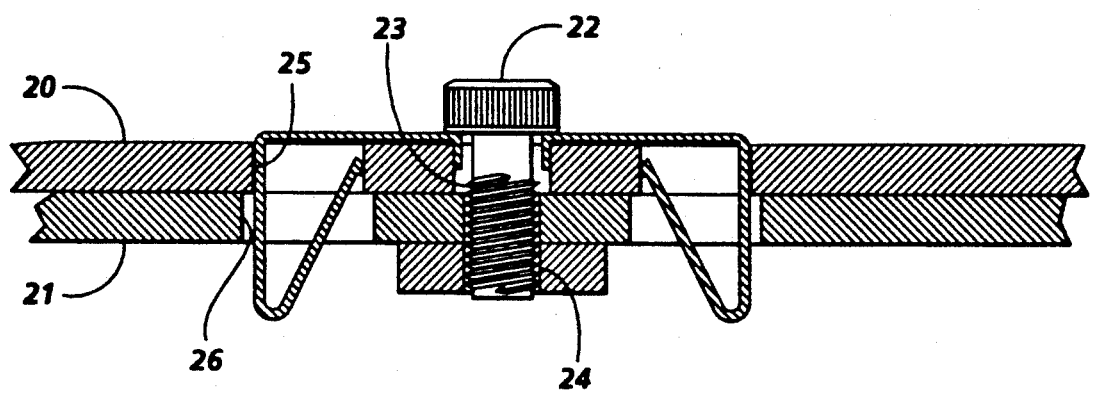
FIG. 3 is a sectional, elevational, view of the clip when in use, taken along the line in the direction of arrows 3—3 of FIG. 2A.

The clip 1 shown in FIG. 1 is for use in securing a machine panel to a machine and, to the end, is intended to be secured to a support bracket of the panel, as will be described below.

The clip 1 is formed from an elongated plate of spring steel and has a flat slotted face 2 with turned-under legs 3 at each end. The slot 4 in the face of the clip has turned-down sides 5, the function of which will be explained below.

Each of the legs 3 is formed by bending down the ends of the steel plate and then turning the ends back up under the face 2 to give the legs an approximate U-shape. The corners of the plate, at the ends of the legs, are bent over to form barbs 6. Cut-outs 7 in the plate, at the junctions between the face 2 and the legs 3, result in projecting tabs 8 being formed at each end of the clip.

Typically, the face 2 of the clip is 17 mm long and 10 mm wide and the tabs 8 project about 1 mm at the ends of the face. The legs 3 extend downwards for about 4.5 mm and the turned-down sides 5 of the slot 4 are about 1 mm deep and 4 mm long.

The clip is used in securing a support bracket 20 of a machine panel to a second bracket 21 which forms part of the main structure of the machine. Portions of the two brackets 20, 21 are shown in FIGS. 2A and 2B, respectively. In FIG. 3, the brackets are shown secured together using the clip 1 and a screw 22. The manner in which the clip is used in arriving at the arrangement shown in FIG. 3 will be described below.

The bracket 20 is intended to be located on top of the bracket 21 and secured in position by the screw 22 which, as shown in FIG. 3, passes through a rectangular aperture 23 in the support bracket 20 and screws into a threaded aperture 24 in the machine bracket 21. The position of the machine bracket 21 is fixed but the position of the panel support bracket 20 relative to the machine bracket can be adjusted, to a certain extent, to permit adjustment of the position of the panel on the machine. The direction in which the bracket 20 can be adjusted is indicated by the arrows 10 in FIG. 2A, the extent of the adjustment being determined by the length of the aperture 23. As shown in FIGS. 2A and 2B, elongated slots 25, 26 are formed in the brackets 20, 21, respectively, on each side of the apertures 23, 24 and are aligned with each other when the bracket 20 is in position on the bracket 21. The slots 25, 26 extend in the adjustment direction 10, the lengths of the slots being sufficient to allow for relative adjustment of the brackets and to accommodate the legs 3 of the clip, as described below. The slots 26 in the fixed bracket 21 are wider than the slots 25 in the support bracket 20, and the reason for that will also be explained below.

Before the machine panel is first secured to the machine, its supporting bracket 20 is adjusted relative to the fixed bracket 21 to provide the required panel position. The brackets are then secured together in the established position by the screw 22, the clip 1 being put into position with the screw 22. The legs 3 of the clip are accommodated in the aligned slots 25, 26 and, as they enter the slots, the ends of the legs are pushed inwardly by engagement with the outer walls of the slots 25. When the brackets 20, 21 are finally secured together by the screw 22, the barbs 6 at the corners of the leg will grip the bracket 20 and inhibit any further movement of the clip 1 relative thereto.

Figure 4:
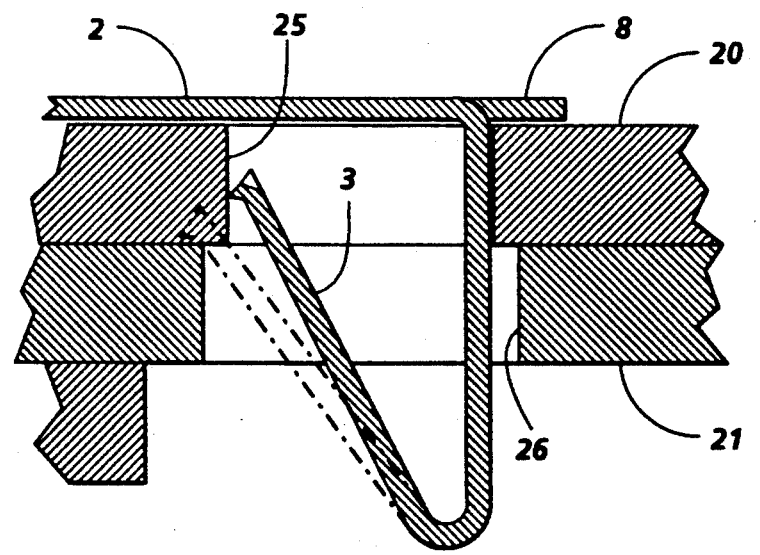
FIG. 4 is an enlarged, sectional elevational detailed view of part of FIG. 3.

The assembled arrangement is as shown in FIGS. 3 and 4. FIG. 4 is a detailed view of the end of one of the legs 3 of the clip 1 and shows, in dotted lines, the original position of the leg before engagement with the wall of the slot 25. FIGS. 3 and 4 both show that the tabs 8 at the ends of the clip sit on the bracket 20 and prevent the legs 3 of the clip from being pushed too far down into the slots 25. The turned-down edges 5 of the slot 4 in the clip extend across the elongated aperture 23 in the bracket 20 and prevent the fixing screw 22 from catching on the comparatively thin material of the clip. In the direction at right angles to those turned-down edges, the thickness of the bracket 20 itself is sufficient to prevent snagging by the screw.

If the panel bracket 20 is removed from the machine bracket 21, for example to provide access to a part of the machine, the screw 22 is loosened. The clip 1, however, remains in position on the bracket 20 (even if the screw 22 is removed completely) because it is held by the barbs 6. The clip 1 accordingly establishes a fixed position for the screw 22 in the support bracket 20 so that, when the support bracket is re-secured to the machine bracket 21, it is not necessary to carry out any adjustment to re-establish the desired relative positions: those positions are obtained automatically by simply tightening the screw in the aperture 24.

It will be appreciated that, although the legs 3 of the clip extend down into the wider slots 26 of the machine bracket 21, they do not positively co-operate with those slots. Indeed, as shown in FIGS. 3 and 4, there is a clearance between the legs 3 and the walls of the slots 26. In some cases, the legs 3 may not even extend into the machine bracket 21, in which case the slots 26 in that bracket could be omitted.

The clip 1 is particularly useful for securing components, such as machine panels, which must be positioned accurately for aesthetic reasons. However, its use is not restricted to such situations and it could be used in other situations where removal and re-assembly of components takes place. Components with which the clip could be used, in addition to machine panels, include items such as covers, guides, stops, adjusters and tensioners.

What is claimed is:

1. A mounting assembly comprising:
   a first member defining an aperture;
   a second member; and
   means for adjustably locating and securing said first member to said second member in an adjusted position, said locating and securing means extending into the aperture of said first member and gripping said first member so as to enable said first member to be removed from said second member and subsequently re-secured thereto in substantially the adjusted position without additional adjustment.

2. A mounting assembly according to claim 1, wherein said locating and securing means includes:
   a clip including a plate mounted on said first member, and a locating member extending in a direction substantially transverse to said plate, said locating member extending into the aperture in said first member and gripping said first member; and
   means for removably attaching said first member to said second member.

3. A mounting assembly comprising:
   a first member defining a pair of substantially parallel elongated slots;
   a second member;
   a clip including a plate mounted on said first member, and a first locating member extending in a direction substantially transverse to said plate, said first locating member extending into one of the elongated slots in said first member and gripping said first member and a second locating member spaced from said first locating member extending into the other of the elongated slots and gripping said first member so as to enable said first member to be removed from said second member and subsequently re-secured thereto in substantially the adjusted position without additional adjustment; and
   means for removably attaching said first member to said second member.

4. A mounting assembly according to claim 3, wherein said first mentioned locating member and said second locating member are integral with said plate and formed by bending opposed ends of said plate.

5. A mounting assembly according to claim 4, wherein said first mentioned locating member and said second locating member include barbs adapted to grip said first member.

6. A mounting assembly according to claim 3, wherein:
   said second member defines a threaded aperture; and
   said attaching means includes a threaded member adapted to engage in the threaded aperture in said second member.

7. A mounting assembly according to claim 6, wherein:
   said first member defines a rectangular opening; and
   said plate defines an aperture, said threaded member being adapted to extend through the rectangular opening in said first member and the aperture in said plate permitting adjustment of said first member relative to said second member.

8. A mounting assembly according to claim 7, wherein said plate member includes marginal portions extending outwardly from said first mentioned locating member and said second locating member, said marginal portions contacting said first member to locate said first mentioned locating member and said second locating member in the respective slots in said first member.

9. A mounting assembly adapted to secure a cover to a frame according to claim 8, wherein:
   said first member is fixedly attached to said cover; and
   said second member is fixedly attached to the frame enabling the cover to be adjusted relative to the frame and removed therefrom.

10. A mounting assembly according to claim 8, wherein said clip is formed from a resilient material.

11. A mounting assembly comprising:
    a first member defining an aperture;
    a second member;
    means for releasably securing said first member to said second member; and
    means for adjustably locating said first member to said second member in an adjusted position, said locating means extending into the aperture of said first member and gripping said first member so as to enable said first member to be removed from said second member and subsequently re-secured thereto in substantially the adjusted position without additional adjustment.

* * * * *